T. N. FLETCHER.
PULSATING MEANS FOR USE IN MILKING MACHINERY.
APPLICATION FILED MAR. 30, 1915.
1,162,594.  Patented Nov. 30, 1915.
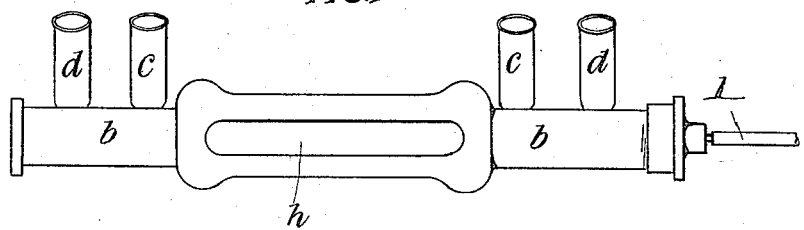
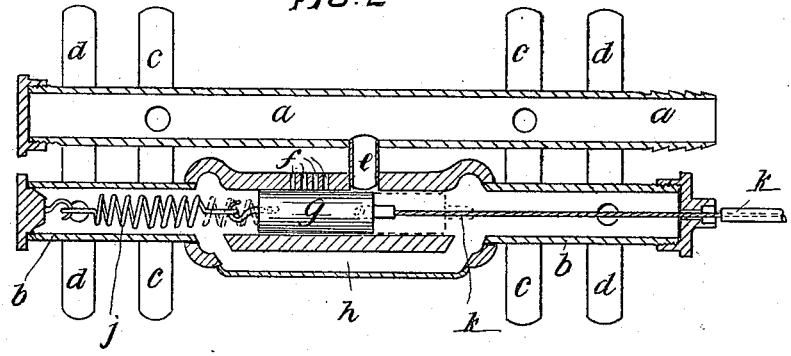
Witnesses:
Inventor:
T. N. Fletcher
By: 
Attorney.

UNITED STATES PATENT OFFICE.

THOMAS NOTON FLETCHER, OF HAMILTON, NEW ZEALAND.

PULSATING MEANS FOR USE IN MILKING MACHINERY.

1,162,594.  Specification of Letters Patent.  Patented Nov. 30, 1915.

Application filed March 30, 1915. Serial No. 17,999.

*To all whom it may concern:*

Be it known that I, THOMAS NOTON FLETCHER, subject of the King of Great Britain, residing at Hamilton, Auckland, New Zealand, have invented a new and useful Improvement in Pulsating Means for Use in Milking Machinery; and I do hereby declare the following to be a full, clear, and exact description of the same.

This invention has been devised in order to provide an improved manner of and means for use in the pulsation of the teat cups in milking machinery.

The invention consists in the combination with each teat cup claw, of a pulsator of special construction adapted in its operation to place the pulsator tube of the claw alternately in communication with the milk vacuum tube of the claw, and with the atmosphere, in order thereby to pulsate the teat cup linings in the required manner. These pulsating means therefore do not require any separate connections with the source of vacuum as with most other pulsators already in use, but employ the same connections as are used for the milking suction on the teats.

The connection of the pulsator tube with the milk tube will cause the air in the outer chambers of the teat cups to be exhausted in the well known way, such air being then drawn into the milk tube and carried along with the milk so as to aid its flow to the receiver. The connection of the pulsator claw with the atmosphere will then allow the air to pass into such outer chambers and exert the desired pressure upon the inflations or linings with which the teat cups are provided, such air being again exhausted on the next movement of the appliance.

In fully describing the invention reference will be made to the accompanying sheet of drawings, in which:—

Figure 1 is a side elevation of the claw fitted with the invention. Fig. 2 is a sectional underneath plan thereof.

The claw is made upon the well known principle having a milk tube $a$ that is connected to the milk receiver in which the milking vacuum is maintained, a pulsator tube $b$ extending parallel with the milk tube, the four teat cup branches $c$ connected with the milk tube $a$, and the four teat cup branches $d$ connected with the pulsator tube $b$. In milking, the several branches $c$ are connected respectively with the inside chambers of the double chambered teat cups employed so as to convey the milk to the tube $a$ while the four branches $d$ are connected respectively with the outside chambers of such teat cups in order to convey the desired pulsations thereto.

In this invention, the two tubes $a$ and $b$ are connected together by a cross tube $e$ situated preferably midway between their ends and the tube $b$ is formed with a number of apertures $f$ in its wall. Within the pulsator tube $b$ is fitted a piston valve $g$ that is adapted to be reciprocated to and fro therein and at the forward extent of its movement to cover the cross tube $e$ and to open the apertures $f$, and at the backward extent of its movement to cover the apertures $f$ and uncover the cross tube $e$. A by pass $h$ is formed in the tube $b$ extending from beyond one end of the piston valve $g$ to the other and this by pass insures a uniformity of the conditions prevailing throughout the whole of the tube and the branches $d$ leading therefrom.

It will be seen that when the piston valve $g$ is drawn to one end to cover the cross passage $e$ and to uncover the apertures $f$, air will enter the tube $b$ and pass into the branches $d$ and through them to the teat cups. Then when the piston valve is moved to the opposite position to cover the apertures $f$ and uncover the cross passage $e$, the air will be shut off and connection will be made between the vacuum tube $a$ and the tube $b$ and its branches $d$ so that the air will be exhausted therefrom and from the teat cups, such air passing along the vacuum pipe with the milk being drawn along it. Thus the regular reciprocations of the piston valve will cause the desired pulsations in the teat cups of the machine.

The piston valve $g$ is reciprocated in any suitable manner and by any convenient means. Suitable means are shown in the drawing and these consist of a spring $j$ attached to the back end of the valve and to the adjacent end of the tube and which spring serves to keep the valve normally drawn over to that limit of its movement. Attached to the other end of the valve is a Bowden or like wire $k$ that passes out through a fitting on the end of the tube and is then connected with any approved apparatus by which it may be alternately pulled and released. A pull on the wire will cause the valve to move forward to cover the cross passage *e* while its release will allow the spring *j* to draw the valve back. Other means than those shown may however be employed if so desired.

The same principle of operation by which the vacuum connections of the teat cup outer chambers are effected by connecting them with the milk tube of the claw, and the air connection made by allowing air to enter the pulsator tube of such claw, may be carried out in a number of ways without departing from the spirit of this invention.

I claim:—

1. In milking machinery, a teat cup claw having a milk-vacuum tube and its branches and a pulsator tube and its branches, a passage extending between the milk-vacuum tube and the pulsator tube, air admission apertures entering the pulsator tube, a slide valve adapted to move reciprocally and at one limit of its movement to open the air admission apertures and to close the passage between the tubes, and at the other limit of its movement to close such air admission apertures and to open the passage between the tubes, and means for reciprocating the slide valve.

2. In milking machinery, means for pulsating the teat cups comprising a teat cup claw of the two tube type and a slide valve adapted to be reciprocated, said claw being provided with ports whereby the reciprocation of the valve alternately places the pulsator tube of the claw in connection with the milk vacuum tube, and with the atmosphere, substantially as specified.

3. In milking machinery, the combination with a teat cup claw having a milk-vacuum tube and a pulsator tube, of a cross passage extending between the two tubes, said pulsator tube being provided with air admission apertures, a slide valve fitted within the pulsator tube and adapted at one limit of its movement to close the cross passage and to open the air admission apertures and at the other limit of its movement to close such apertures and to open the cross passage, a spring connected to one end of the slide valve and normally keeping it at one limit of its movement, and a Bowden wire connected to the other end of the slide valve and adapted to be alternately pulled and released, substantially as and for the purposes specified.

In testimony whereof I have signed this specification in the presence of two subscribing witnesses.

THOMAS NOTON FLETCHER.

Witnesses:
E. BUCHARD SMITH,
E. F. COURTNEY.

Copies of this patent may be obtained for five cents each, by addressing the "Commissioner of Patents, Washington, D. C."